(12) United States Patent
Lee et al.

(10) Patent No.: US 12,259,971 B2
(45) Date of Patent: Mar. 25, 2025

(54) METHOD, APPARATUS, AND COMPUTER-READABLE RECORDING MEDIUM FOR PERFORMING MACHINE LEARNING-BASED OBSERVATION LEVEL MEASUREMENT USING SERVER SYSTEM LOG AND PERFORMING RISK CALCULATION USING THE SAME

(71) Applicant: SGA Solutions Co., Ltd., Seoul (KR)

(72) Inventors: Ki Uk Lee, Seongnam-si (KR); Jong Hwa Lee, Seoul (KR)

(73) Assignee: SGA Solutions Co., Ltd., Seoul (KR)

( * ) Notice: Subject to any disclaimer, the term of this patent is extended or adjusted under 35 U.S.C. 154(b) by 196 days.

(21) Appl. No.: 17/870,000

(22) Filed: Jul. 21, 2022

(65) Prior Publication Data

US 2023/0177152 A1 Jun. 8, 2023

(30) Foreign Application Priority Data

Dec. 8, 2021 (KR) ........................ 10-2021-0174671

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC . G06F 21/554; G06F 21/551; G06F 2221/034
See application file for complete search history.

(56) References Cited

U.S. PATENT DOCUMENTS

| 2019/0215330 A1* | 7/2019 | Neuvirth | ............. H04L 63/1425 |
| 2020/0401696 A1* | 12/2020 | Ringlein | ............... G06F 21/552 |

FOREIGN PATENT DOCUMENTS

| KR | 10-1469283 | 12/2014 |
| KR | 10-1880686 | 7/2018 |
| KR | 10-2017756 | 9/2019 |
| KR | 10-2089688 | 4/2020 |
| KR | 10-2108960 | 5/2020 |

OTHER PUBLICATIONS

Office Action for Korean Patent Application No. 10-2021-0174671, dated Feb. 10, 2022.

* cited by examiner

*Primary Examiner* — Brian F Shaw (57) ABSTRACT

The present disclosure relates to a method of performing machine learning-based observation level measurement including: a log preprocessing step; a log file linkage step of processing a log file to store the log file in a HDFS, and linking the processed log file to a big data storage; a feature value extraction step of requesting an inquiry of a raw log, and extracting a feature value for a normal behavior from the inquired raw log; a model training step of normalizing the extracted feature value to level a baseline value for the normal behavior, and training a machine learning model based on the leveled baseline value; and a risk calculation step of determining, when a log that violates the leveled baseline value is detected, that an abnormal behavior is detected so as to calculate a risk for the detected abnormal behavior.

10 Claims, 10 Drawing Sheets

| Level data | 2type | | 3type | | 4type | | taffic | |
|---|---|---|---|---|---|---|---|---|
| | from | to | from | to | from | to | from | to |
| 1 | 0 | 1 | 0 | 1 | 0 | 1 | 0 | 1048576 |
| 2 | 1 | 2 | 1 | 2 | 1 | 2 | 1048576 | 2097152 |
| 3 | 2 | 3 | 2 | 3 | 2 | 3 | 2097152 | 3145728 |
| 4 | 3 | 5 | 3 | 4 | 3 | 4 | 3145728 | 4194304 |
| 5 | 4 | 5 | 4 | 5 | 4 | 5 | 4194304 | 9437184 |
| 6 | 5 | 7 | 5 | 8 | 5 | 9 | 9437184 | 14680064 |
| 7 | 7 | 9 | 8 | 11 | 9 | 13 | 14680064 | 19922944 |
| ... | ... | ... | ... | ... | ... | ... | ... | ... |
| 30 | 219 | 235 | 1030 | 1120 | 2729 | 2985 | 36835426304 | 53219426304 |

| Table | time type | Training data1 | Training data2 | Label (Count) | Algorithm | Level | Java class name/ code name |
|---|---|---|---|---|---|---|---|
| netstatus | HH24/Week | equip_id, time | remote_addr | count(*) | logistic regression | X | HH24_0 WEEK_0 |
| | HH24/Week | equip_id, time | – | count(*) | logistic regression | X | HH24_1 WEEK_1 |
| traffic | HH24/Week | equip_id, time | interface | count(*) | logistic regression | X | HH24_0 WEEK_0 |
| | HH24/Week | equip_id, time | interface | sum (inbytes) | logistic regression | Y | HH24_1 WEEK_1 |
| loginh | HH24/Week | equip_id, time | – | count(*) | logistic regression | X | HH24_0 WEEK_0 |
| | HH24/Week | equip_id, time | userid, hostname, terminal | count(*) | logistic regression | X | HH24_1 WEEK_1 |
| loginf | HH24/Week | equip_id, time | – | count(*) | logistic regression | X | HH24_0 WEEK_0 |
| session | HH24/Week | equip_id, time | – | count(*) | logistic regression | X | HH24_0 WEEK_0 |
| | HH24/Week | equip_id, time | cmd_path, cmd_args | count(*) | logistic regression | X | HH24_1 WEEK_1 |
| sulog | HH24/Week | equip_id, time | suresult | count(*) | logistic regression | X | HH24_0 WEEK_0 |
| pamlog | HH24/Week | equip_id, time | – | count(*) | logistic regression | X | HH24_0 WEEK_0 |
| kernlog | HH24/Week | equip_id, time | – | count(*) | logistic regression | X | HH24_0 WEEK_0 |

| -- bid : baseline ID<br>-- create time : Target time "2017-09-30 23:00"~"2017-09-30 24:00"<br>-- count : Number of generations<br>-- mlevel : Prediction level (appropriate level predicted by Mahout)<br>-- rlevel : Observation level (numerical value obtained by leveling the number of generations)<br>-- [features] : User ID (userid), Access address (hostname) | | | | | | | |
|---|---|---|---|---|---|---|---|
| Output pane | | | | | | | |
| Data Output | | | | | | | |
| baseline id | createtime | count<br>bigint | mlevel<br>integer | rlevel<br>integer | distance<br>integer | user id | Host name |
| LoginH week1 | 17/10/16 00:00 | 11 | 3 | 7 | 4 | admin | WIN-P70RQFRU064 |
| LoginH week1 | 17/10/16 00:00 | 11 | 3 | 7 | 4 | admin | WIN-P70RQFRU064 |
| LoginH HH24 1 | 17/11/20 20:00 | 5 | 1 | 5 | 4 | aptcastle | |
| LoginH HH24 1 | 17/11/20 20:00 | 4 | 1 | 4 | 3 | aptcastle | |
| LoginH HH24 1 | 17/11/20 20:00 | 5 | 1 | 5 | 4 | aptcastle | |
| LoginH HH24 1 | 17/11/21 20:00 | 4 | 1 | 4 | 3 | aptcastle | |
| LoginH HH24 1 | 17/11/22 20:00 | 4 | 1 | 4 | 3 | root | 192.168.31.170 |
| LoginH HH24 1 | 17/11/23 20:00 | 5 | 1 | 5 | 4 | root | 192.168.31.170 |
| LoginH HH24 1 | 17/11/24 20:00 | 4 | 1 | 4 | 3 | root | 192.168.31.170 |
| LoginH HH24 1 | 17/11/25 20:00 | 4 | 1 | 4 | 3 | aptcastle | |

| -- bid : baseline ID |
| -- create time : Target time "2017-09-30 23:00"~"2017-09-30 24:00" |
| -- count : Number of generations |
| -- mlevel : Prediction level (appropriate level predicted by Mahout) |
| -- rlevel : Observation level (numerical value obtained by leveling the number of generations) |
| -- [features] : Access address (remote_addr) |

| Output pane | | | | | | |
|---|---|---|---|---|---|---|
| Data Output | | | | | | |
| baseline id | createtime | count bigint | mlevel integer | rlevel integer | distance integer | remote addr |
| LoginH week1 | 17/11/28 16:00 | 6 | 1 | 6 | 5 | 192.168.20.26 |
| LoginH week1 | 17/11/28 16:00 | 13927 | 7 | 30 | 23 | 192.168.2.20 |
| LoginH HH24 1 | 17/11/28 17:00 | 4633 | 7 | 30 | 23 | 192.168.2.20 |
| LoginH HH24 1 | 17/11/28 17:00 | 6 | 6 | 6 | 0 | 192.168.20.26 |
| LoginH HH24 1 | 17/11/28 18:00 | 6 | 6 | 6 | 0 | 192.168.20.26 |
| LoginH HH24 1 | 17/11/28 19:00 | 6 | 6 | 6 | 0 | 192.168.20.26 |
| LoginH HH24 1 | 17/11/28 20:00 | 6 | 6 | 6 | 0 | 192.168.20.26 |
| LoginH HH24 1 | 17/11/28 20:00 | 13 | 6 | 6 | 2 | 192.168.2.20 |
| LoginH HH24 1 | 17/11/28 21:00 | 12 | 8 | 8 | 0 | 192.168.2.20 |
| LoginH HH24 1 | 17/11/28 23:00 | 12 | 8 | 8 | 0 | 192.168.2.20 |

| -- bid : baseline ID |
| -- create time : Target time "2017-09-30 23:00"~"2017-09-30 24:00" |
| -- count : Number of generations |
| -- mlevel : Prediction level (appropriate level predicted by Mahout) |
| -- rlevel : Observation level (numerical value obtained by leveling the number of generations) |
| -- [features] : Local network (interface |

| Output pane | | | | | | |
|---|---|---|---|---|---|---|
| Data Output | | | | | | |
| baseline id | createtime | count<br>bigint | mlevel<br>integer | rlevel<br>integer | distance<br>integer | interface |
| Traffic HH24 2 | 17/04/06 09:00 | 282112360 | 10 | 29 | 19 | eth0 |
| Traffic HH24 2 | 17/04/06 09:00 | 282112360 | 10 | 29 | 19 | eth0 |
| Traffic HH24 2 | 17/04/06 10:00 | 7309438 | 1 | 10 | 9 | lan0 |
| Traffic HH24 2 | 17/04/06 10:00 | 7309438 | 1 | 10 | 9 | lan0 |
| Traffic HH24 2 | 17/04/06 11:00 | 3389333 | 6 | 7 | 6 | lan0 |
| Traffic HH24 2 | 17/04/06 11:00 | 1545125132 | 11 | 29 | 18 | eth0 |
| Traffic HH24 2 | 17/04/06 11:00 | 3389333 | 1 | 7 | 6 | lan0 |
| Traffic HH24 2 | 17/04/06 11:00 | 1545125132 | 11 | 29 | 18 | eth0 |
| Traffic HH24 2 | 17/04/06 12:00 | 2456646 | 1 | 6 | 5 | lan0 |
| Traffic HH24 2 | 17/04/06 12:00 | 2456646 | 1 | 6 | 5 | lan0 |

METHOD, APPARATUS, AND COMPUTER-READABLE RECORDING MEDIUM FOR PERFORMING MACHINE LEARNING-BASED OBSERVATION LEVEL MEASUREMENT USING SERVER SYSTEM LOG AND PERFORMING RISK CALCULATION USING THE SAME

BACKGROUND OF THE INVENTION

1. Field of the Invention

The present invention relates to a technology of profiling sophisticated security threats as recent malicious codes or behavior-based security threats become more advanced and sophisticated, and identifying risks of the profiled security threats to perform an optimal response, thereby preventing the security threats from leading to security incidents, and preventing an extent of damage of the security incident from expanding.

2. Description of the Related Art

In general, most operating systems or applications used in computers store the current status of a system in the form of logs and information in a storage medium.

Such log files may be recorded with a process of executing an operating system or an application, that is, a progress so as to be used as a basis for identifying a cause when a problem occurs. In the past, when there are a plurality of applications to be managed, an operator had to manually check a log file stored for each device in which the application is installed offline to determine a cause of a problem, so that a considerable amount of time has been required to identify and solve the problem.

Accordingly, Korean Patent Registration No. 10-1357135 discloses a log information collection apparatus to propose a technology of collecting log information generated during an operation process from a plurality of applications, and synchronizing with a DB linked to the collected log information based on another framework or a data size so as to identify a cause of a problem by immediately checking the log information when a failure occurs.

However, recently, going beyond collecting log files from different devices, attention has been focused on issues to rapidly detect security threat situations by automatically monitoring a large amount of events and logs, and technical issues to effectively reduce a false detection rate in response to a varying internal network environment while effectively responding to diversifying advanced persistent threats (APTs).

SUMMARY OF THE INVENTION

An object of the present invention is to provide a technology of identifying security threats through a profiling scheme among schemes for detecting risks of the security threats to perform an optimal response as recent malicious codes or behavior-based security threats become more advanced and sophisticated, thereby preventing the security threats from leading to security incidents, and preventing an extent of damage of the security incident from expanding.

To achieve the objects described above, a method for performing machine learning-based observation level measurement using a server system log and performing risk calculation using the machine learning-based observation level measurement, which is implemented in a computing device including at least one processor and at least one memory for storing instructions that are executable by the processor, includes: a log preprocessing step of collecting, by a log collection server, a log generated in a server system, and processing the collected log to store the processed log as a log file classified for each type; a log file linkage step of processing data of the log file to store the log file stored in the log preprocessing step in a Hadoop distributed file system (HDFS), and linking the processed log file to a big data storage; a feature value extraction step of communicating, by a log analysis server, with the big data storage to request an inquiry of a raw log collected by the log collection server, and extracting a feature value for a normal behavior from the inquired raw log; a model training step of normalizing the extracted feature value to level a baseline value for the normal behavior, and training a machine learning model based on the leveled baseline value; and a risk calculation step of storing the trained machine learning model in a database, and determining, when a log that violates the leveled baseline value is detected, that an abnormal behavior is detected so as to calculate a risk for the detected abnormal behavior.

In addition, when the feature value extraction step is performed, the log analysis server may request the inquiry of the raw log collected by the log collection server at every preset period, so that the feature value is updated according to the preset period.

In addition, the model training step may include leveling the log file stored in the Hadoop distributed file system by using an open source, in which a baseline value for a generation amount of logs for each type is queried from n pieces of level data at a unit time period including at least one of an hour, a day, a week, and a month when the leveling is performed.

In addition, the risk calculation step includes leveling the log in which the abnormal behavior is detected by using the open source to calculate an observation level, and comparing the calculated observation level with a prediction level queried from the n pieces of level data to calculate the risk for the abnormal behavior.

In addition, the risk calculation step may include inquiring the observation level and the prediction level to calculate an error between an average value of the observation level and an average value of the prediction level so as to calculate the risk for the abnormal behavior.

In addition, the risk for the abnormal behavior may be defined as caution when the error between the average value of the observation level and the average value of the prediction level is less than 0, defined as danger when the error between the average value of the observation level and the average value of the prediction level is greater than 0 and less than 15, and defined as critical when the error between the average value of the observation level and the average value of the prediction level is greater than 15 and less than 25, so that the risk according to a generation amount of errors is guided.

In addition, the risk calculation may include controlling, by a security kernel, access to a behavior including at least one of an abnormal process execution behavior, an important file access behavior, and a dangerous instruction execution behavior in the server system when the abnormal behavior for the server system is detected.

In addition, the risk calculation step may include generating warning data according to a risk calculation result for the abnormal behavior to report the generated warning data to at least one control terminal.

Meanwhile, an apparatus for performing machine learning-based observation level measurement using a server system log and performing risk calculation using the machine learning-based observation level measurement, which is implemented in a computing device including at least one processor and at least one memory for storing instructions that are executable by the processor, includes: a log preprocessing unit for collecting, by a log collection server, a log generated in a server system, and processing the collected log to store the processed log as a log file classified for each type; a log file linkage unit for processing data of the log file to store the log file stored in the log preprocessing unit in a Hadoop distributed file system (HDFS), and linking the processed log file to a big data storage; a feature value extraction unit for communicating, by a log analysis server, with the big data storage to request an inquiry of a raw log collected by the log collection server, and extracting a feature value for a normal behavior from the inquired raw log; a model training unit for normalizing the extracted feature value to level a baseline value for the normal behavior, and training a machine learning model based on the leveled baseline value; a risk calculation unit for storing the trained machine learning model in a database, and determining, when a log that violates the leveled baseline value is detected, that an abnormal behavior is detected so as to calculate a risk for the detected abnormal behavior.

Meanwhile, there is provided a computer-readable recording medium, wherein the computer-readable recording medium stores instructions for causing a computing device to perform: a log preprocessing step of collecting, by a log collection server, a log generated in a server system, and processing the collected log to store the processed log as a log file classified for each type; a log file linkage step of processing data of the log file to store the log file stored in the log preprocessing step in a Hadoop distributed file system (HDFS), and linking the processed log file to a big data storage; a feature value extraction step of communicating, by a log analysis server, with the big data storage to request an inquiry of a raw log collected by the log collection server, and extracting a feature value for a normal behavior from the inquired raw log; a model training step of normalizing the extracted feature value to level a baseline value for the normal behavior, and training a machine learning model based on the leveled baseline value; and a risk calculation step of storing the trained machine learning model in a database, and determining, when a log that violates the leveled baseline value is detected, that an abnormal behavior is detected so as to calculate a risk for the detected abnormal behavior.

According to one embodiment of the present invention, security threats may be identified through a profiling scheme among schemes for detecting risks of the security threats to perform an optimal response as recent malicious codes or behavior-based security threats become more advanced and sophisticated, so that the security threats can be prevented from leading to security incidents, and an extent of damage of the security incident can be prevented from expanding.

In addition, according to one embodiment of the present invention, a large amount of logs that are generated may be collected and learned to sort an abnormal behavior through an automated baseline value according to a type of the log and a generation amount of logs without setting a separate threshold, so that security threats can be detected, and risks can be determined based on the detected security threats.

In addition, according to one embodiment of the present invention, conventional procedures related to security management and breach incident response, which have been performed in a security manager-centric manner, may be automated, so that a common breach attempt detection level can be improved without depending on capabilities of the manager.

In addition, according to one embodiment of the present invention, a security solution capable of minimizing performance delay in processing a large amount of log data, and easily expanding according to a subsequent increase of log data without a high initial construction cost can be provided.

DETAILED DESCRIPTION OF THE INVENTION

Hereinafter, various embodiments and/or aspects will be disclosed with reference to the drawings. In the following description, for the purpose of description, numerous specific details are set forth in order to provide a thorough understanding of one or more aspects. However, it shall also be appreciated by a person having ordinary skill in the art to which the present invention pertains that such aspect(s) may be practiced without the specific details. The following description and the accompanying drawings will be set forth in detail for specific illustrative aspects among the one or more aspects. However, the aspects are provided for illustrative purposes, some of various schemes based on principles of various aspects may be employed, and descriptions set forth herein are intended to include all the aspects and equivalents thereof.

The terms "embodiment", "example", "aspect", "illustration", and the like used herein may not be construed as indicating that any aspect or design set forth herein is preferable or advantageous over other aspects or designs.

In addition, it is to be understood that the terms "include" and/or "comprise" indicate the presence of corresponding features and/or elements, but do not preclude the presence or addition of one or more other features, elements, and/or groups thereof.

In addition, although the terms including an ordinal number such as "first" or "second" may be used to describe various elements, the elements are not limited by the terms. The above terms are used merely for the purpose of distinguishing one element from another element. For example, a first element may be termed as a second element, and similarly, a second element may also be termed as a first element without departing from the scope of the present invention. The term "and/or" includes any combination of a plurality of described relevant items, or one of the described relevant items.

Further, unless defined otherwise, all terms used in embodiments of the present invention, including technical and scientific terms, have the same meaning as those commonly understood by a person having ordinary skill in the art to which the present invention pertains. Any terms as those defined in generally used dictionaries are to be interpreted to have the meanings equal to the contextual meanings in the relevant field of art, and are not to be interpreted to have idealistic or formalistic excessively meanings unless explicitly defined in the embodiments of the present invention.

The present invention relates to a method for performing machine learning-based observation level measurement using a server system log and performing risk calculation using the machine learning-based observation level measurement.

In detail, a main object of the present invention is to provide a technology of identifying security threats through a profiling scheme among schemes for detecting risks of the security threats to perform an optimal response as recent malicious codes or behavior-based security threats become more advanced and sophisticated, thereby preventing the security threats from leading to security incidents, and preventing an extent of damage of the security incident from expanding.

Meanwhile, the present invention for achieving the above objects will be described in detail below with reference to the accompanying drawings, in which a plurality of drawings may be simultaneously referenced to describe one or more technical features or elements constituting the invention.

Figure 1:
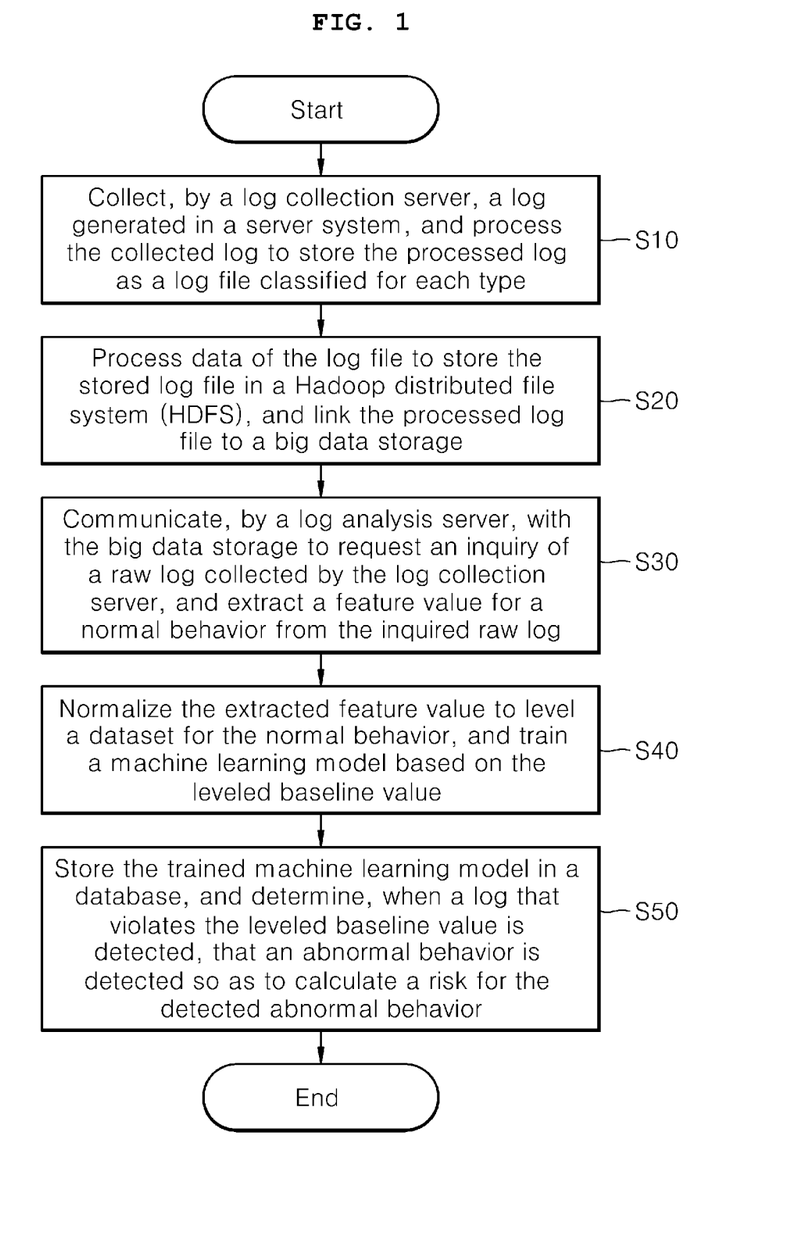
FIG. 1 is a flowchart showing a method for performing machine learning-based observation level measurement using a server system log and performing risk calculation using the machine learning-based observation level measurement according to one embodiment of the present invention.

Referring to FIG. 1, FIG. 1 is a flowchart showing a method for performing machine learning-based observation level measurement using a server system log and performing risk calculation using the machine learning-based observation level measurement according to one embodiment of the present invention.

First, according to the present invention, a log preprocessing step S10 of collecting, by a log collection server, a log generated in a server system, and processing the collected log to store the processed log as a log file classified for each type may be performed.

In detail, the log collection server of the step S10 may be understood as a subsystem for collecting information on a behavior performed by a user on a web or an application, which is recorded as a log over time, to provide the collected information in a processed form.

In this case, in the step S10, the collected log may be processed and stored as the log file classified for each type as described above. This may be understood as structurization performed by standardized processing of storing log data, which is unstructured data, according to a set format and a set structure, so that query processing for detecting an abnormal behavior including a security threat, which will be described below, may be smoothly performed.

For example, the log file may be standardized as data including at least one of a fixed column, spreadsheet data in which data properties are determined by specified rows and columns, and CSV data determined in a comma structure.

Meanwhile, after the step S10 is performed, a log file linkage step S20 of processing data of the log file that is previously stored to store the log file stored in the step S10 in a Hadoop distributed file system (HDFS), and linking the processed log file to a big data storage may be performed.

In this case, the Hadoop distributed file system described above refers to an open source framework for large-scale data analysis processing, which may be installed and operated on a plurality of Linux servers and may ensure a large data storage space of petabytes or more with excellent scalability. In particular, the Hadoop distributed file system may have a high large-scale data processing speed because a plurality of servers simultaneously perform distributed processing on data, and may use a Linux device to construct the system at a lower cost than a relational database management system (RDBMS) that uses an expensive device.

Meanwhile, according to the present invention, all metadata of the log file may be managed as name nodes through the Hadoop distributed file system described above, and a plurality of data nodes in which data divided in a unit of a block is stored may be configured below the name node, so that a data input/output request from the name node and a client may be managed.

In addition, according to the present invention, the log file distributed and stored in the Hadoop distributed file system may be linked to the big data storage, which is for the purpose of improving a performance delay problem upon log analysis. This is because the performance delay problem may be solved based on a high processing speed that is unique to the big data storage by loading log data linked to the big data storage without loading the log data from the Hadoop distributed file system when an analysis target log is loaded by linking the Hadoop distributed file system to the big data storage.

Meanwhile, after the step S20 is performed, a feature value extraction step S30 of communicating, by a log analysis server, with the big data storage to request an inquiry of a raw log collected by the log collection server, and extracting a feature value for a normal behavior from the inquired raw log may be performed.

In this case, the raw log refers to an original log of the log transmitted from the server system, which indicates an unprocessed log, and the feature value extracted from the raw log may be subsequently compared with the analysis target log so as to be used to monitor whether the abnormal behavior is detected.

In addition, when the step S30 is performed, the log analysis server may preferably request the inquiry of the raw log collected by the log collection server at every preset period (e.g., one day, one week, one month, etc.), so that the feature value may be updated according to the preset period so as to periodically update training data for a machine learning model that will be described below, and thus advancement of the machine learning model that will be described below may be promoted.

Figure 5:
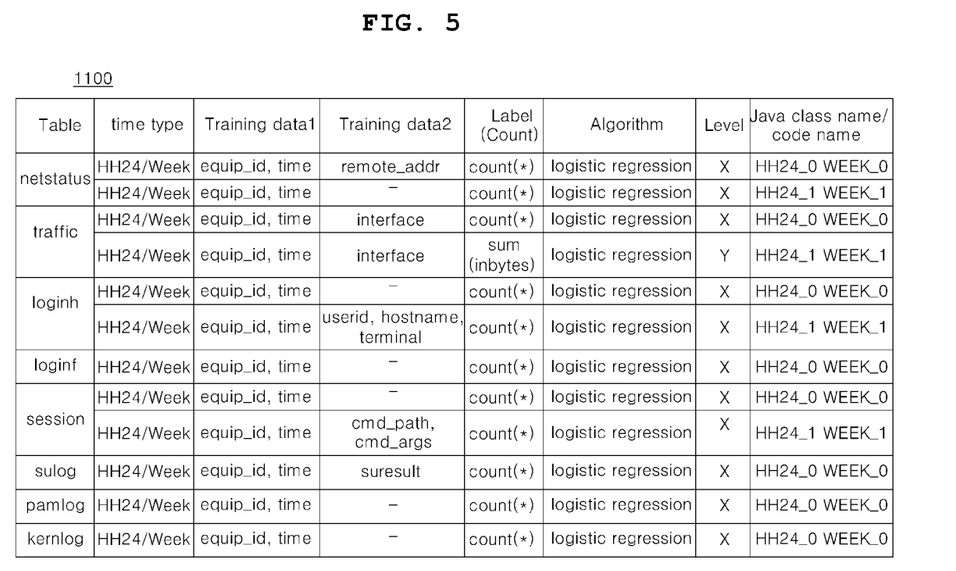
FIG. 5 is a view showing a table of an example in which a machine learning model is updated by training data according to one embodiment of the present invention.

As one embodiment, 1100 of FIG. 5 shows an example in which training data for updating a machine learning model is generated by inquiring and learning a feature value in a unit of 24 hours on weekdays except for weekends.

In addition, a baseline value of the training data used to update the machine learning model may vary according to a type of a log collected during a unit period and a generation amount of the log, so that the machine learning model may be trained with mutually different training data according to a unit time period, but the present invention is not limited thereto.

Referring again to FIG. 1 to continue the description, after the step S30 is performed, a model training step S40 of normalizing the extracted feature value to level a baseline value for the normal behavior, and training a machine learning model based on the leveled baseline value may be performed.

In detail, in the step S40, the extracted feature value may be normalized to train the machine learning model with the baseline value for the normal behavior, so that the training for allowing the machine learning model to derive an automated baseline value according to the type and the generation amount of the log may be performed.

Meanwhile, in the step S40, the training of the machine learning model may be understood as leveling of the baseline value for the normal behavior by calculating probability based on a logistic regression classifier and performing classification based on the calculated probability, and such logistic regression analysis may have high accuracy and flexibility in binomial categorical data analysis so as to be highly utilized.

In addition, preferably, the step S40 may include leveling the log file stored in the Hadoop distributed file system by using a separately prepared open source, in which a baseline value for a generation amount of logs for each type may be queried from level data, which is defined as n pieces of level data, at a unit time period including at least one of an hour, a day, a week, and a month when the leveling is performed.

Figure 4:
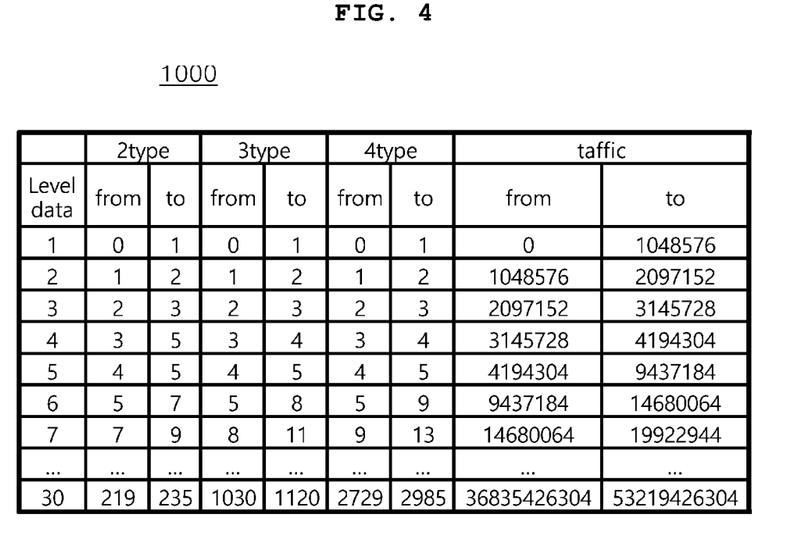
FIG. 4 is a view showing a definition example of level data required for learning a baseline according to one embodiment of the present invention.

As one embodiment, 1000 of FIG. 4 shows an example in which 30 feature values required for the learning of the baseline value are defined in four types.

In particular, according to the present invention, since the machine learning model is trained based on a feature value of an actual log, and the learning model is automatically and periodically updated, a fixed threshold based on past statistics may be set, so that a problem of rarely enabling detection of an abnormal behavior that appears in a new form may be solved.

In addition, according the present invention, in the step S40, the abnormal behavior such as a security threat may be detected based on the baseline value that is automatically learned through machine learning training rather than a passive experience value, so that diversifying abnormal behaviors may be easily detected.

Meanwhile, after the step S40 is performed, a risk calculation step S50 of storing the trained machine learning model in a database, and determining, when a log that violates the leveled baseline value is detected from an analysis target log, that an abnormal behavior is detected so as to calculate a risk for the detected abnormal behavior may be performed.

In this case, in the step S50, when the log that violates the baseline value, that is, a log that does not belong to the baseline value is detected, the abnormal behavior may be determined as being detected, so that unknown new and mutant abnormal behaviors may be easily detected.

Preferably, the step S50 may include leveling the log in which the abnormal behavior is detected by using the open source to calculate an observation level, and comparing the calculated observation level with a prediction level queried from the defined n pieces of level data to calculate the risk for the abnormal behavior.

In this case, the step S50 may include inquiring the observation level and the prediction level to calculate an error between an average value of the observation level and an average value of the prediction level so as to calculate the risk for the abnormal behavior. For a more detailed description of the above configuration, reference will be simultaneously made to FIG. 3, which is a flowchart showing a logic of a risk calculation process.

Figure 3:
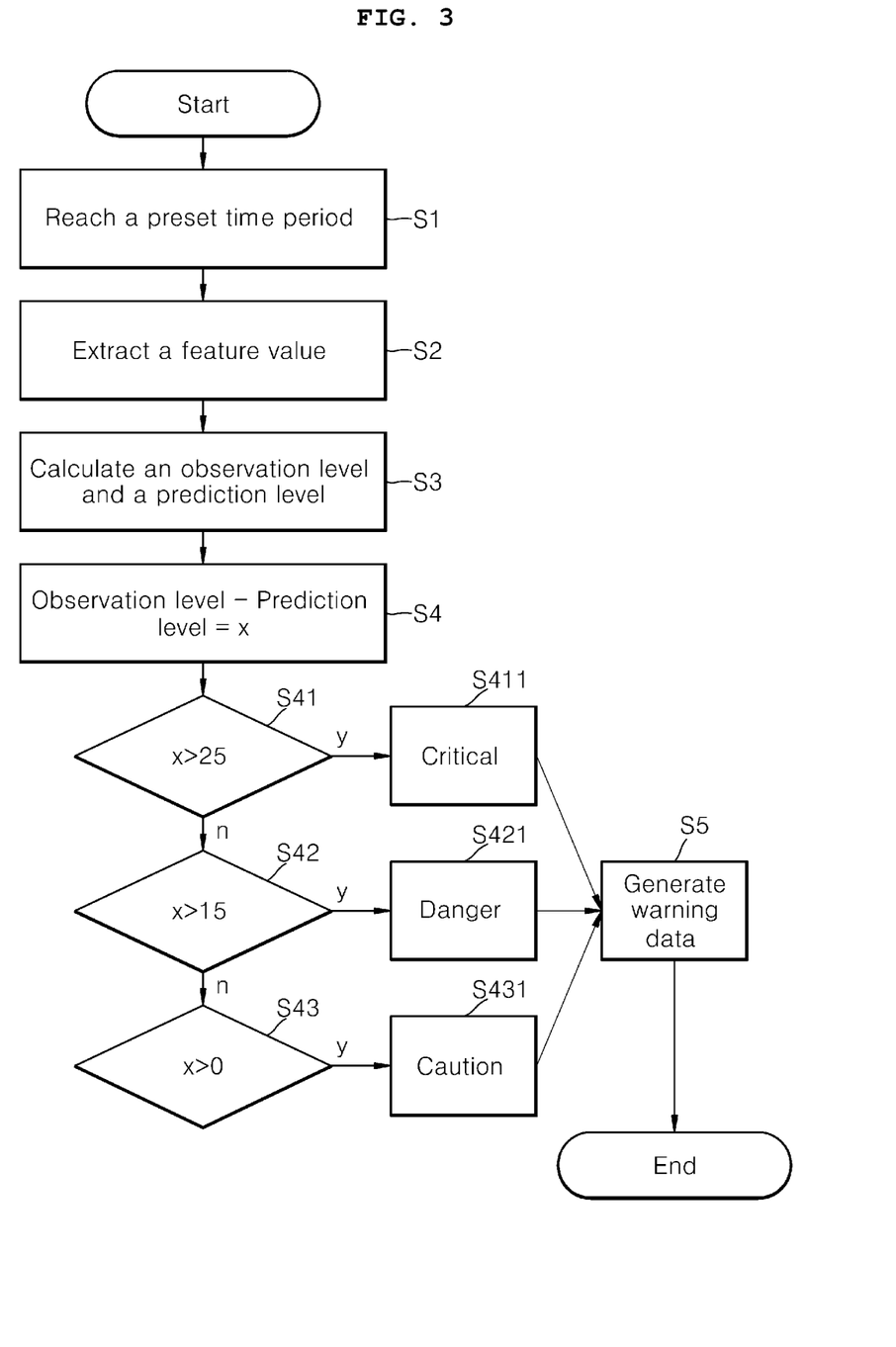
FIG. 3 is a view showing a logic example of a risk calculation process according to one embodiment of the present invention.

Referring to FIG. 3, when determined that a preset unit time period has been reached in a step S1, a step S2 may be performed to extract the feature value of the analysis target log. In this case, a step S3 of calculating the observation level and the prediction level for the analysis target log from the extracted feature value may be performed, and a step S4 of calculating a value obtained by subtracting the prediction level from the calculated observation level may be performed.

Meanwhile, according to the present invention, the risk for the abnormal behavior may be determined from an error of the value obtained by subtracting the prediction level from the observation level by consecutively performing steps S41 to S43.

In detail, the risk may be computed to be in a caution step S431 when an error x is less than 0, in a danger step S421 when the error x is greater than 0 and less than 15, and in a critical step S411 when the error x is greater than 15 and less than 25.

Furthermore, according to the present invention, a step S5 of generating warning data according to a risk computation result in the steps S411, S421, and S431 to provide the generated warning data may be performed.

In this case, the warning data refers to data including the risk calculation result for the abnormal behavior, and may be understood as data including a source, time information, and the like of the log in which the abnormal behavior is detected.

Meanwhile, the warning data may be reported to at least one control terminal including a security manager terminal.

Meanwhile, according to another embodiment of the present invention, the step S5 of FIG. 3 may perform a function of controlling, by a security kernel, access to a behavior including at least one of an abnormal process execution behavior, an important file access behavior, and a dangerous instruction execution behavior in the server system immediately when the abnormal behavior for the server system is detected. This may control execution of an automatically detected abnormal behavior with the absence of a security manager or without depending on capabilities of the security manager so that a more sophisticated security solution may be provided.

In addition, according to another embodiment of the present invention, the abnormal behavior included in the warning data described above may be profiled, and a behavior may be extracted as a suspected abnormal behavior when a log corresponding to the profiled abnormal behavior is detected, so that systematization of a response policy for the abnormal behavior may be promoted while detecting the abnormal behavior more rapidly, but the present invention is not limited thereto.

Meanwhile, referring to FIG. 3, a block diagram in which a process from log collection to generation of warning data may be viewed at a glance is shown.

In other words, according to the present invention, when the log is collected, the normalization may be performed to normalize the log that is in an unstructured state, and the feature value for the normal behavior may be extracted, so that the observation level and the prediction level may be defined.

Figure 2:
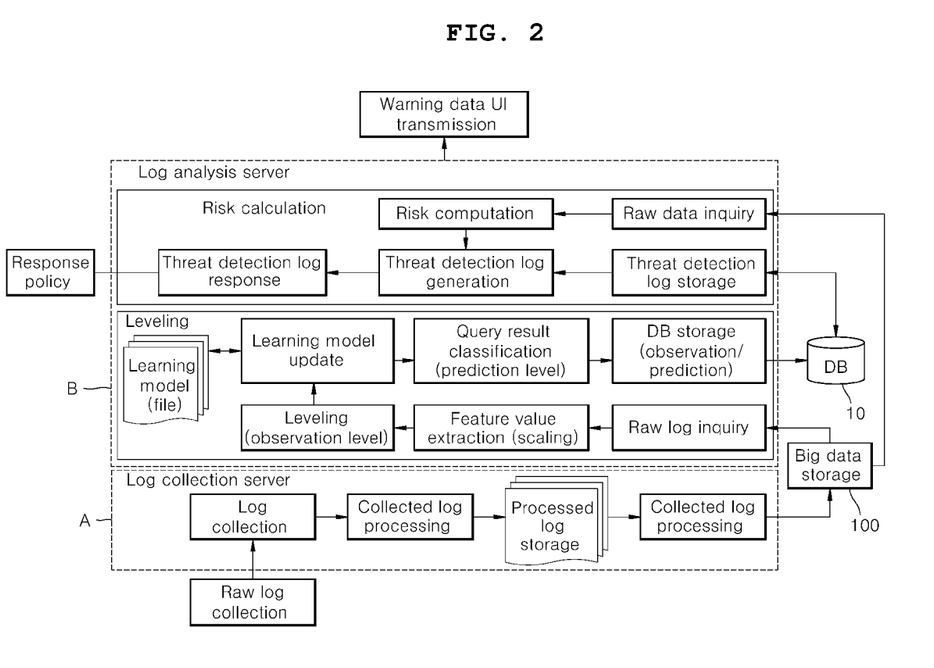
FIG. 2 is a block diagram showing a main configuration of each server end and a function performed in the main configuration according to one embodiment of the present invention.

Next, referring to FIG. 2, FIG. 2 is a block diagram showing the present invention described above when viewed from a log collection server A and a log analysis server B, in which a data processing process of each of the servers is shown.

In brief, the log collection server A may perform a function of collecting a log from a server system, processing the collected log, and storing the processed log in a distributed data system to generate a standardized log file, and may allow the generated log file to be linked to a big data storage 100 and shared with the log analysis server B.

In this case, the log analysis server B may communicate with the big data storage 100 so as to inquire a raw log for a normal behavior to extract a feature value, normalize and level the extracted feature value, and train a machine learning model with a leveled dataset, so that a baseline reference for a normal behavior for each log type may be set.

Next, risk calculation of an analysis target log in the log analysis server B may include performing a function of applying raw data of the analysis target log to the machine learning model in which pre-stored raw data for the normal behavior is trained, determining whether the analysis target log has a log value for an abnormal behavior in which a security threat is present by comparing errors, and calculating a risk from an observation level and a prediction level calculated for the analysis target log.

In this case, when the security threat to the analysis target log is detected to compute the risk, according to the present invention, the log in which the abnormal behavior is detected may be stored to transmit warning data, or may be used as basic data for establishing a response policy for the abnormal behavior.

Figure 6:
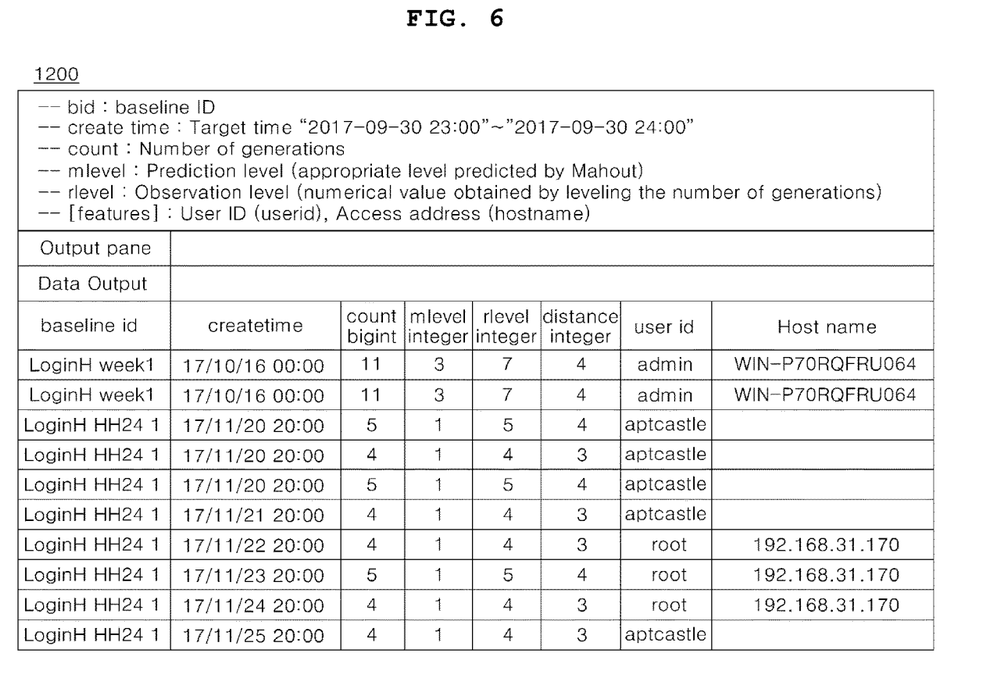
FIGS. 6 to 8 are views showing examples of log data detected as abnormal behaviors according to an error between an observation level and a prediction level according to one embodiment of the present invention.
Figure 7:
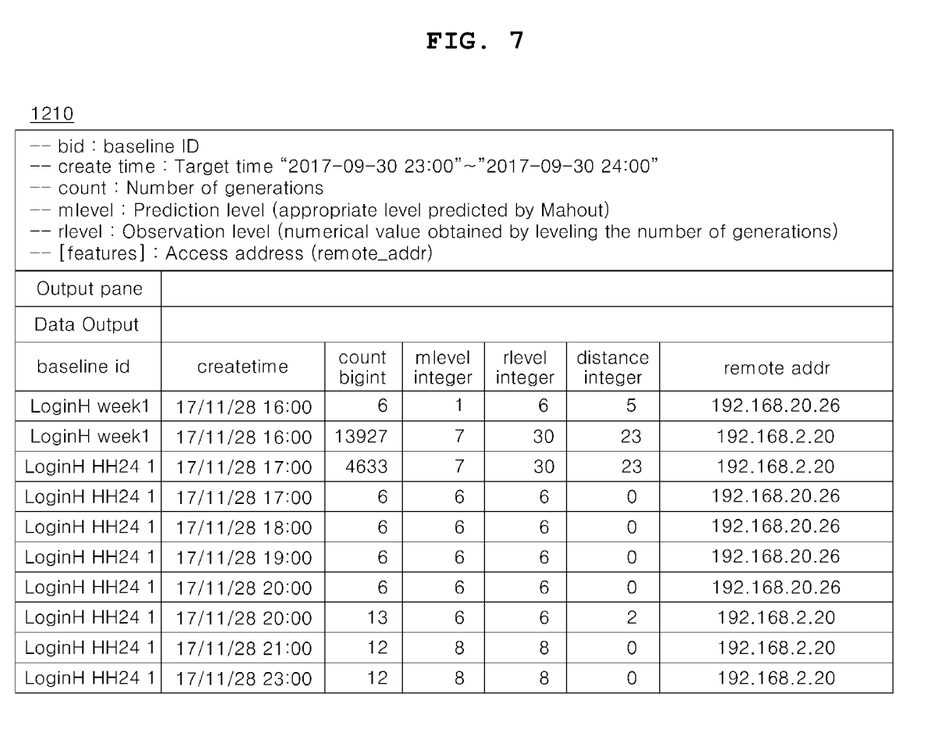
Figure 8:
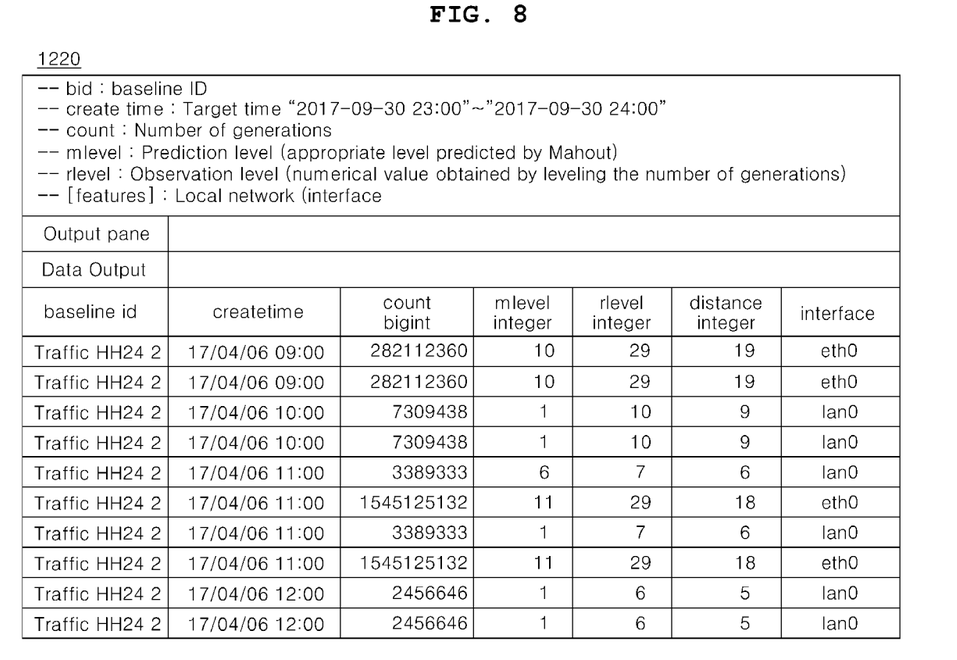

Meanwhile, the embodiments of 1200, 1210, and 1220 shown in FIGS. 6 to 8 may be understood as data tables of leveled baseline values that are stored in a database.

Mainly, createtime may be understood as a generation time of the analysis target log, count may be understood as a generation amount of logs, mlevel may be understood as a prediction level, rlevel may be understood as an observation level, which is a numerical value obtained by leveling a number of log generations, and distance integer may be understood as an error between the observation level and the prediction level, which a reference value for computing the risk.

In detail, 1200 of FIG. 6 may be understood as an embodiment in which a user ID userid and an access address hostname are extracted from a raw log as feature values, 1210 of FIG. 7 may be understood as an embodiment in which an access address remote_addr is extracted from the raw log as a feature value, and 1220 of FIG. 8 may be understood as an embodiment in which a local network interface is extracted from the raw log as a feature value.

In summary, according to the present invention, the raw log stored in the log collection server may be inquired to extract the feature value, and training data of the machine learning model may be updated through the normalization and the leveling of the feature value. In particular, according to the present invention, the observation level and the prediction level may be simultaneously stored in the database as the training data to calculate errors (or distances), so that the risk of the analysis target log may be determined.

In other words, as a result of a comprehensive examination, according to one embodiment of the present invention, risks of the profiled security threats may be identified to perform an optimal response as recent malicious codes or behavior-based security threats become more advanced and sophisticated, so that the security threats may be prevented from leading to security incidents, and an extent of damage of the security incident may be prevented from expanding.

In addition, according to one embodiment of the present invention, a large amount of logs that are generated may be collected and learned to sort an abnormal behavior through an automated baseline value according to a type of the log and a generation amount of logs without setting a separate threshold, so that security threats may be detected, and risks may be determined based on the detected security threats.

In addition, according to one embodiment of the present invention, conventional procedures related to security management and breach incident response, which have been performed in a security manager-centric manner, may be automated, so that a common breach attempt detection level may be improved without depending on capabilities of the manager.

In addition, according to one embodiment of the present invention, a security solution capable of minimizing performance delay in processing a large amount of log data, and easily expanding according to a subsequent increase of log data without a high initial construction cost may be provided.

Although the above description has been made with reference to specific embodiments and drawings, various modifications and changes can be made by those skilled in the art from the above description.

Figure 9:
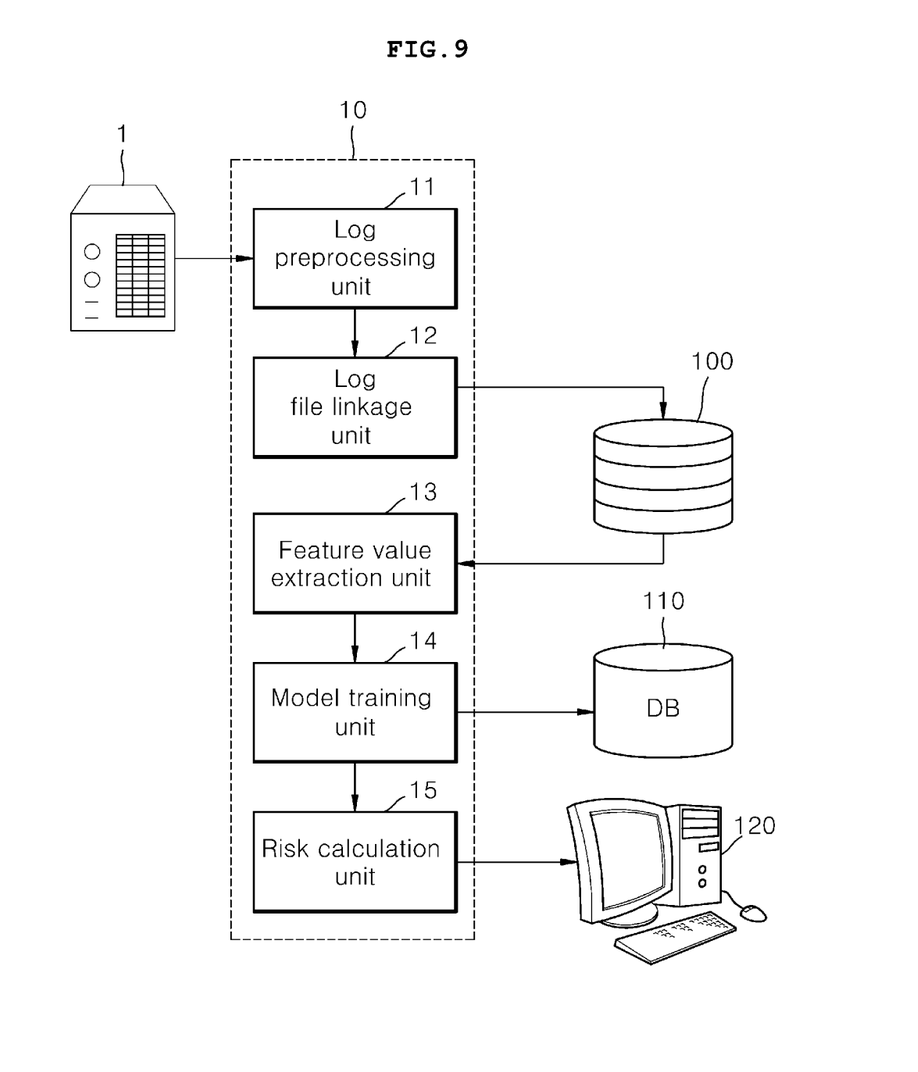
FIG. 9 is a block diagram showing an apparatus for performing machine learning-based observation level measurement using a server system log and performing risk calculation using the machine learning-based observation level measurement according to one embodiment of the present invention.

Meanwhile, FIG. 9 is a block diagram showing an apparatus 10 for performing machine learning-based observation level measurement using a log of a server system 1 and performing risk calculation using the machine learning-based observation level measurement according to one embodiment of the present invention.

As shown in FIG. 9, according to the present invention, an apparatus 10 may include a log preprocessing unit 11, a log file linkage unit 12, a feature value extraction unit 13, a model training unit 14, and a risk calculation unit 15 as main components.

In this case, the log preprocessing unit 11 may perform a function of collecting, by a log collection server, a log generated in a server system 1, and processing the collected log to store the processed log as a log file classified for each type.

In other words, the log preprocessing unit 11 may process the log file, which is unstructured data, into structured data, so as to structuralize the log file to facilitate operations such as search, selection, update, and deletion, so that an accurate response to a query may be provided.

As a result, the log preprocessing unit 11 may perform all the functions performed in the step S10 of FIG. 1, which are described above.

Next, the log file linkage unit 12 may perform a function of processing data of the log file to store the log file stored in the log preprocessing unit 11 in a Hadoop distributed file system (HDFS), and linking the processed log file to a big data storage 100.

In other words, the log file linkage unit 12 may perform all the functions performed in the step S20 of FIG. 1, which are described above. According to the present invention, the function of the log file linkage unit 12 may be performed to increase linkage between the log collection server and the log analysis server.

In addition, the feature value extraction unit 13 may perform a function of communicating, by a log analysis server, with the big data storage 100 to request an inquiry of a raw log collected by the log collection server, and extracting a feature value for a normal behavior from the inquired raw log.

In other words, the feature value extraction unit 13 may perform all the functions performed in the step S30 of FIG. 1, and the function of the feature value extraction unit 13 may be performed to extract a feature value exhibiting a normal behavior so as to provide a detection reference for an abnormal behavior including a security threat.

In addition, the model training unit 14 may perform a function of normalizing the extracted feature value to level a baseline value for the normal behavior, and training a machine learning model based on the leveled baseline value.

In other words, the model training unit 14 may perform all the functions performed in the step S40 of FIG. 1, which are described above. According to the present invention, the function of the model training unit 14 may be performed to continuously update the machine learning model for detecting the abnormal behavior, so that an algorithm that may effectively respond to even a newly appearing APT may be constructed.

Next, the risk calculation unit 15 may perform a function of storing the trained machine learning model in a database 110, and determining, when a log that violates the leveled baseline value is detected from an analysis target log, that an abnormal behavior is detected so as to calculate a risk for the detected abnormal behavior.

In other words, the risk calculation unit 15 may perform all the functions performed in the step S50 of FIG. 1. The function of the risk calculation unit 15 may be performed to predict a security threat state and automate a conventional procedure in which a manager has to be involved, so that a common breach attempt detection level may be improved without depending on capabilities of the manager In addition, since the risk calculation unit 15 includes a communication module, the calculated security threat may be reported to a preset manager terminal 120, but the present invention is not limited thereto.

Although the above description has been made with reference to specific embodiments and drawings, various modifications and changes can be made by those skilled in the art from the above description.

Figure 10:
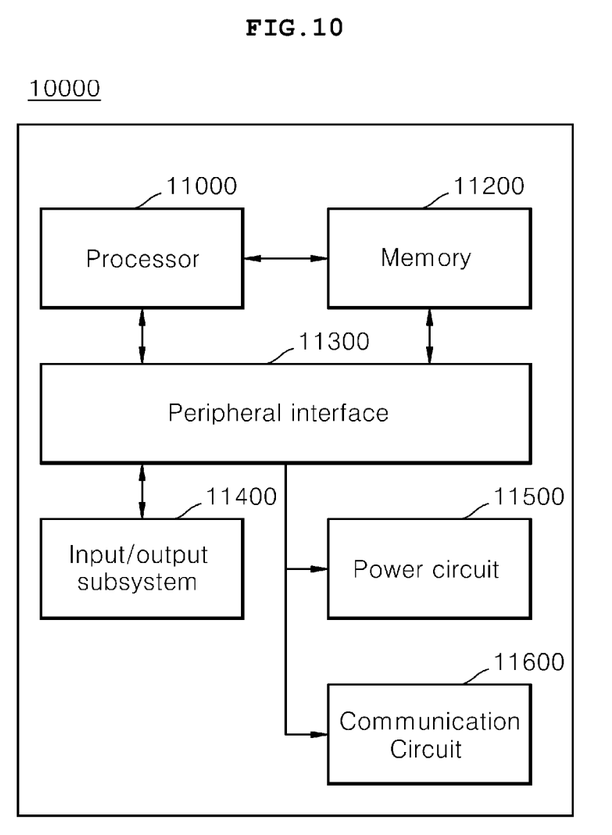
FIG. 10 is a view showing an example of an internal configuration of a computing device according to one embodiment of the present invention.

Next, referring to FIG. 10, FIG. 10 shows one example of an internal configuration of a computing device according to one embodiment of the present invention. In the following description, redundant descriptions of the embodiment corresponding to the above descriptions for FIGS. 1 to 9 will be omitted.

As shown in FIG. 10, a computing device 10000 may at least include at least one processor 11100, a memory 11200, a peripheral interface 11300, an input/output (I/O) subsystem 11400, a power circuit 11500, and a communication circuit 11600. In this case, the computing device 10000 may correspond to a user terminal A connected to a tactile interface device A, or correspond to a computing device B described above.

The memory 11200 may include, for example, a high-speed random access memory, a magnetic disk, an SRAM, a DRAM, a ROM, a flash memory, and a non-volatile memory. The memory 11200 may include a software module, an instruction set, or other various data required for an operation of the computing device 10000.

In this case, access to the memory 11200 from other components of the processor 11100, the peripheral interface 11300, or the like may be controlled by the processor 11100.

The peripheral interface 11300 may couple an input and/or output peripheral device of the computing device 10000 to the processor 11100 and the memory 11200. The processor 11100 may execute the software module or the instruction set stored in the memory 11200 to perform various functions for the computing device 10000 and process data.

The I/O subsystem 11400 may couple various input/output peripheral devices to the peripheral interface 11300. For example, the I/O subsystem 11400 may include a controller for coupling the peripheral device, such as a monitor, a keyboard, a mouse, a printer, or a touch screen or a sensor if necessary, to the peripheral interface 11300. According to another aspect, input/output peripheral devices may be coupled to the peripheral interface 11300 without passing through the I/O subsystem 11400.

The power circuit 11500 may supply a power to all or some of the components of the terminal. For example, the power circuit 11500 may include a power management system, at least one power source such as a battery or an alternating current (AC), a charging system, a power failure detection circuit, a power converter or inverter, a power status indicator, and any other components for generating, managing, or distributing a power.

The communication circuit 11600 may use at least one external port to enable communication with other computing devices.

Alternatively, as described above, the communication circuit 11600 may include an RF circuit, if necessary, to transmit and receive an RF signal, also known as an electromagnetic signal, thereby enabling the communication with other computing devices.

The above embodiment of FIG. 10 is merely an example of the computing device 10000, and a computing device 10000 may have a configuration or arrangement that omits some of the components shown in FIG. 10, further includes an additional component that is not shown in FIG. 10, or combines at least two components. For example, a computing device for a communication terminal in a mobile environment may further include a touch screen, a sensor, and the like in addition to the components shown in FIG. 10, and the communication circuit 11600 may include a circuit for RF communication in various communication schemes (such as Wi-Fi, 3G, LTE, Bluetooth, NFC, and Zigbee). The components that may be included in the computing device 10000 may be implemented as hardware, software, or a combination of both hardware and software including at least one integrated circuit specialized in signal processing or an application.

The methods according to the embodiment of the present invention may be implemented in the form of program instructions that may be executed through various computing devices, and may be recorded in a computer-readable medium. In particular, a program according to the present embodiment may be configured as a PC-based program or an application dedicated to a mobile terminal. An application to which the present invention is applied may be installed in a user terminal through a file provided by a file distribution system. For example, the file distribution system may include a file transmission unit (not shown) for transmitting the file according to a request from the user terminal.

The device described above may be implemented as a hardware component, a software component, and/or a combination of the hardware component and the software component. For example, the devices and components described in the embodiments may be implemented by using at least one general purpose computer or special purpose computer such as a processor, a controller, an arithmetic logic unit (ALU), a digital signal processor, a microcomputer, a field programmable gate array (FPGA), a programmable logic unit (PLU), a microprocessor, or any other device capable of executing and responding to an instruction. The processing device may execute an operating system (OS) and at least one software application executed on the operating system.

In addition, the processing device may access, store, manipulate, process, and generate data in response to the execution of the software. In some cases, one processing device is described as being used for convenience of understanding. However, it will be appreciated by those skilled in the art that the processing device may include a plurality of processing elements and/or a plurality of types of processing elements. For example, the processing device may include a plurality of processors or one processor, and one controller. In addition, other processing configurations such as a parallel processor may be possible.

The software may include a computer program, a code, an instruction, or a combination of at least one thereof, and may configure the processing device to operate as desired or instruct the processing device independently or collectively. In order for the software and/or data to be interpreted by the processing device or to provide an instruction or data to the processing device, the software and/or data may be permanently or temporarily embodied in any type of machine, component, physical device, virtual equipment, computer storage medium, or device. The software may be distributed over computing devices, which are connected through a network, so as to be stored or executed in a distributed manner. The software and data may be stored in at least one computer-readable recording medium.

The method according to the embodiment may be implemented in the form of a program instruction that may be executed through various computer mechanisms, and may be recorded in a computer-readable medium. The computer-readable medium may include a program instruction, a data file, a data structure, and the like, alone or in combination with each other. The program instruction recorded on the medium may be specially designed and configured for the embodiment, or may be known and available to those skilled in the art of computer software. An example of the computer-readable recording medium includes a magnetic media such as a hard disk, a floppy disk, and a magnetic tape, an optical media such as a CD-ROM and a DVD, a magneto-optical media such as a floptical disk, and a hardware device specially configured to store and execute a program instruction such as a ROM, a RAM, and a flash memory.

An example of the program instruction includes a high-level language code that may be executed by a computer by using an interpreter or the like, as well as a machine language code generated by a compiler. The hardware device may be configured to operate as at least one software module to perform the operations of the embodiments, and vice versa.

Although the above description has been made with reference to specific embodiments and drawings, various modifications and changes can be made by those skilled in the art from the above description. For example, even when the described techniques are performed in an order that is different from the described manner, and/or the described components such as systems, structures, devices, and circuits are coupled or combined in a form that is different from the described manner, or replaced or substituted by other components or equivalents, appropriate results may be achieved. Therefore, other implementations, other embodiments, and equivalents to the claims are also within the scope of the appended claims.

What is claimed is:

1. A method for performing machine learning-based observation level measurement using a server system log and performing risk calculation using the machine learning-based observation level measurement, which is implemented in a computing device including at least one processor and at least one memory for storing instructions that are executable by the processor, the method comprising:
    a log preprocessing step of collecting, by a log collection server, a log generated in a server system, processing the collected log into a predefined structured data format, and storing the processed log as a log file classified according to the structured data format that defines data attributes of the processed log;
    a log file linkage step of processing data of the log file to store the log file stored in the log preprocessing step in a Hadoop distributed file system (HDFS), and linking the processed log file to a big data storage;
    a feature value extraction step of communicating, by a log analysis server, with the big data storage to request an inquiry of a raw log collected by the log collection server, and extracting a feature value for a normal behavior from the inquired raw log;
    a model training step of normalizing the extracted feature value to level a baseline value for the normal behavior, and training a machine learning model based on the leveled baseline value; and
    a risk calculation step of storing the trained machine learning model in a database, and determining, when a log that violates the leveled baseline value is detected from an analysis target log, that an abnormal behavior is detected so as to calculate a risk for the detected abnormal behavior.

2. The method of claim 1, wherein, when the feature value extraction step is performed, the log analysis server requests the inquiry of the raw log collected by the log collection server at every preset period, so that the feature value is updated according to the preset period.

3. The method of claim 1, wherein the model training step includes leveling the log file stored in the Hadoop distributed file system by using an open source, in which a baseline value for a generation amount of logs for each type is queried from level data, which is defined as n pieces of level data, at a unit time period including at least one of an hour, a day, a week, and a month when the leveling is performed.

4. The method of claim 3, wherein the risk calculation step includes leveling the log in which the abnormal behavior is detected by using the open source to calculate an observation level, and comparing the calculated observation level with a prediction level queried from the defined n pieces of level data to calculate the risk for the abnormal behavior.

5. The method of claim 4, wherein the risk calculation step includes inquiring the observation level and the prediction level to calculate an error between an average value of the observation level and an average value of the prediction level so as to calculate the risk for the abnormal behavior.

6. The method of claim 5, wherein the risk for the abnormal behavior is defined as caution when the error between the average value of the observation level and the average value of the prediction level is less than 0, defined as danger when the error between the average value of the observation level and the average value of the prediction level is greater than 0 and less than 15, and defined as critical when the error between the average value of the observation level and the average value of the prediction level is greater than 15 and less than 25, so that the risk according to a generation amount of errors is guided.

7. The method of claim 1, wherein the risk calculation step includes controlling, by a security kernel, access to a behavior including at least one of an abnormal process execution behavior, an important file access behavior, and a dangerous instruction execution behavior in the server system when the abnormal behavior for the server system is detected.

8. The method of claim 1, wherein the risk calculation step includes generating warning data according to a risk calculation result for the abnormal behavior to report the generated warning data to at least one control terminal.

9. An apparatus for performing machine learning-based observation level measurement using a server system log and performing risk calculation using the machine learning-based observation level measurement, which is implemented in a computing device including at least one processor and at least one memory for storing instructions that are executable by the processor, the apparatus comprising:
   a log preprocessing unit for collecting, by a log collection server, a log generated in a server system, processing the collected log into a predefined structured data format, and storing the processed log as a log file classified according to the structured data format that defines data attributes of the processed log;
   a log file linkage unit for processing data of the log file to store the log file stored in the log preprocessing unit in a Hadoop distributed file system (HDFS), and linking the processed log file to a big data storage;
   a feature value extraction unit for communicating, by a log analysis server, with the big data storage to request an inquiry of a raw log collected by the log collection server, and extracting a feature value for a normal behavior from the inquired raw log;
   a model training unit for normalizing the extracted feature value to level a baseline value for the normal behavior, and training a machine learning model based on the leveled baseline value; and
   a risk calculation unit for storing the trained machine learning model in a database, and determining, when a log that violates the leveled baseline value is detected from an analysis target log, that an abnormal behavior is detected so as to calculate a risk for the detected abnormal behavior.

10. A non-transitory computer-readable recording medium, wherein the non-transitory computer-readable recording medium stores instructions for causing a computing device to perform:
   a log preprocessing step of collecting, by a log collection server, a log generated in a server system, processing the collected log into a predefined structured data format, and storing the processed log as a log file classified according to the structured data format that defines data attributes of the processed log;
   a log file linkage step of processing data of the log file to store the log file stored in the log preprocessing step in a Hadoop distributed file system (HDFS), and linking the processed log file to a big data storage;
   a feature value extraction step of communicating, by a log analysis server, with the big data storage to request an inquiry of a raw log collected by the log collection server, and extracting a feature value for a normal behavior from the inquired raw log;
   a model training step of normalizing the extracted feature value to level a baseline value for the normal behavior, and training a machine learning model based on the leveled baseline value; and
   a risk calculation step of storing the trained machine learning model in a database, and determining, when a log that violates the leveled baseline value is detected from an analysis target log, that an abnormal behavior is detected so as to calculate a risk for the detected abnormal behavior.

* * * * *